United States Patent
Jensen et al.

(10) Patent No.: US 9,590,481 B2
(45) Date of Patent: Mar. 7, 2017

(54) ROTOR

(75) Inventors: Finn Jensen, Ulstrup (DK); Henrik Ørskov Pedersen, Silkeborg (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 741 days.

(21) Appl. No.: 14/110,286

(22) PCT Filed: Mar. 29, 2012

(86) PCT No.: PCT/EP2012/055725
§ 371 (c)(1),
(2), (4) Date: Oct. 7, 2013

(87) PCT Pub. No.: WO2012/136575
PCT Pub. Date: Oct. 11, 2012

(65) Prior Publication Data
US 2014/0147309 A1 May 29, 2014

(30) Foreign Application Priority Data
Apr. 8, 2011 (EP) .................................... 11002949

(51) Int. Cl.
*H02K 21/46* (2006.01)
*H02K 1/27* (2006.01)
(52) U.S. Cl.
CPC ......... *H02K 21/46* (2013.01); *H02K 2213/03* (2013.01)
(58) Field of Classification Search
CPC ......... H02K 1/223; H02K 1/246; H02K 21/46
See application file for complete search history.

(56) References Cited

U.S. PATENT DOCUMENTS

| | | | | |
|---|---|---|---|---|
| 4,358,696 A | * | 11/1982 | Liu | H02K 21/46 310/156.56 |
| 4,922,152 A | * | 5/1990 | Gleghorn | H02K 1/2766 29/598 |
| 5,097,166 A | | 3/1992 | Mikulic | |
| 6,727,627 B1 | * | 4/2004 | Sasaki | H02K 21/46 310/156.53 |

(Continued)

FOREIGN PATENT DOCUMENTS

| | | |
|---|---|---|
| JP | 54 32715 A | 3/1979 |
| JP | 10 336927 A | 12/1998 |

(Continued)

*Primary Examiner* — Tran Nguyen
(74) *Attorney, Agent, or Firm* — McGlew and Tuttle, P.C.

(57) ABSTRACT

A rotor (2) for an electric motor, which rotor (2) includes a plurality of laminated rotor sheets (4) arranged in layers and each provided with slots (6, 10); a number of permanent magnets (8) arranged within magnet slots (10) in the laminated rotor sheets (4), where an end area (16) of each magnet slot (10) is a magnet free area. The rotor (2) also includes a plurality of rotor bars (14) arranged in rotor bar slots (6) and a rotor sheet band (22) provided between the end area (16) and the adjacent rotor bar slot (6). At least one notch (28, 29) extending from the edge (21) of the rotor bar slot (6) and/or from the edge (21') of the end area (16) divides the rotor sheet band (22) into a first area (24) and a second area (26). The smallest width ($D_1$) of the first area (24) is smaller than the smallest width ($D_2$) of the second area (26).

20 Claims, 12 Drawing Sheets

(56) References Cited

U.S. PATENT DOCUMENTS

| | | | |
|---|---|---|---|
| 6,844,652 B1* | 1/2005 | Chu | H02K 1/276 |
| | | | 310/156.53 |
| 6,891,300 B2* | 5/2005 | Noda | H02K 21/46 |
| | | | 310/156.78 |
| 2010/0133941 A1 | 6/2010 | Feng et al. | |
| 2010/0156228 A1* | 6/2010 | Kalluf | H02K 21/46 |
| | | | 310/156.83 |
| 2010/0187935 A1 | 7/2010 | Nam et al. | |

FOREIGN PATENT DOCUMENTS

| | | |
|---|---|---|
| WO | 01/06624 A1 | 1/2001 |
| WO | 2008/137709 A2 | 11/2008 |
| WO | 2010/047657 A1 | 4/2010 |

\* cited by examiner

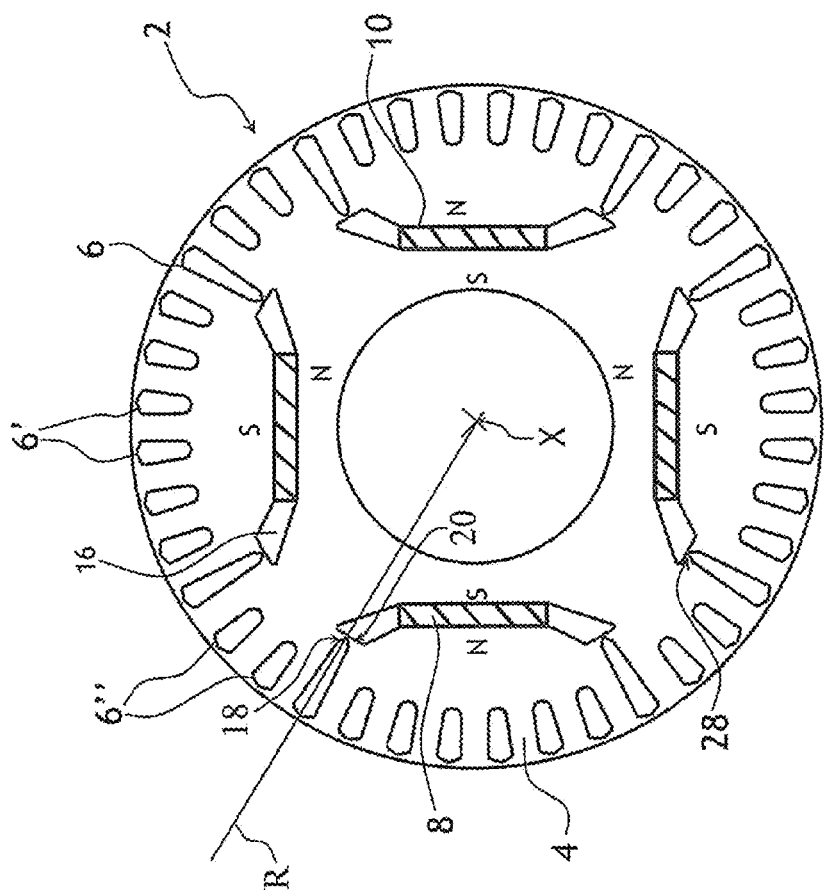

ROTOR

CROSS REFERENCE TO RELATED APPLICATIONS

This application is a United States National Phase Application of International Application PCT/EP2012/055725 filed Mar. 29, 2012 and claims the benefit of priority under 35 U.S.C. §119 of European Patent Application EP 11002949.3 filed Apr. 8, 2011, the entire contents of which are incorporated herein by reference.

FIELD OF THE INVENTION

The present invention generally relates to a rotor for an electric motor. The present invention more particularly relates to a rotor for a line start permanent magnet motor.

BACKGROUND OF THE INVENTION

A line start motor is an electric motor that is equipped with both permanent magnets and short circuit bars in its rotor. A conventional line start permanent magnet motor has magnets inside the induction starting cage. It is known from the prior art that permanent magnet motors have good operating characteristics at synchronous speed. Typical rotors for line start permanent magnet motors are made of a plurality of laminated rotor sheets stacked on the top of each other in order to form a core. Punched slots are provided in the rotor sheets and these slots are configured to receive an aluminum die cast squirrel cage and magnets. A set of thin laminated rotor sheet are required in order to avoid generation of eddy currents in the axial direction of the rotor. The squirrel cage is used to start up and run the motor approximately up to synchronous speed. At synchronous speed the magnets take over and keep the rotor rotating at the synchronous speed.

The bridges between an air filled magnet slot and the adjacent aluminum slot is of great importance. Those bridges must be thick enough to give the required mechanical strength and to ensure that no aluminum flows from the aluminum slot to the magnet slot, during the die cast process, because this will make it impossible to mount the magnets into the magnet slot.

The bridges should be kept as thin as possible seen from an electromagnetic point of view because a significant part of the flux from the magnet flows in the bridges and does not link with the stator current. The problem is that this leakage magnet flux does not contribute to the torque. Accordingly, the bridges must be kept as thin as possible in order to until is as much of the magnets as possible.

US 2010/0133941 A1 discloses a rotor for a line start permanent magnet motor.

In this patent application the bridges are greater than 1 mm and thus a significant magnetic flux leakage is to be expected.

It is well known that each magnet slot for the permanent magnets in a line start motor has to be surrounded by a magnet free end area. This end area is needed in order to avoid short circuit of the magnetic flux so that a greater part of the end portion of the permanent magnets can be used to generate torque. WO 2008/137709 A2 discloses a rotor for a line start permanent magnet motor in which the bridges are bar shaped. This geometry is used very frequently in the prior art.

WO 0106624 A1, on the other hand, a rotor for a line start permanent magnet motor in which the magnet free end area has a basically triangular shape.

In the prior art the bridges are greater than 1 mm and thus a significant magnetic flux leakage is to be expected.

SUMMARY OF THE INVENTION

It is an object for the present invention to specify a rotor, for line start permanent magnet motor in which the magnetic flux, running in undesired directions, can be reduced. It is further an object of the present invention to specify a rotor that minimizes the magnetic leakage flux.

These and other objects and advantages of the present invention will be apparent from the following description and the appended claims. It will be recognized that the foregoing description is not intended to list all of the features and advantages of the invention. Various embodiments of the inventions will satisfy various combinations of the objects of the invention and some embodiments of the invention will provide fewer than all of the listed features and satisfy fewer than all the listed objectives.

The objects of the present invention can be accomplished by a rotor as described in the introductory part of claim 1 that is characteristic in that at least one notch extending from the edge of the rotor bar slot and/or from the edge of the end area divides the rotor sheet band into a first area and a second area, where the smallest width of the first area is smaller than the smallest width of the second area.

Hereby it is achieved that the magnetic flux running in undesired directions can be reduced and that the magnetic leakage flux can be reduced. Therefore, a greater part of the end portion of the permanent magnets can be used to generate torque. Accordingly, less magnetic material is needed a line start motor according to the invention and hence the motor may be cheaper than the prior art line start motors.

The notch may have any suitable form. The notches may be conical, V-shaped, U-shaped or rectangular by way of example. In one embodiment according to the invention, the notch has a longitudinal geometry and extends basically perpendicular to an edge of the rotor sheet band and/or basically perpendicular to an edge of the side of a magnet slots.

It may be an advantage that the notch extends at least half way through the rotor sheet band. Hereby it is possible to reduce the width of the bridges so that as much of the magnets as possible can be utilized.

The first area may have any suitable form and it may depend on the number of notches and by the geometry of the notches. The width of the first area or second area may vary, however; it is also possible that the smallest width can be found in more than one place in the first area or second area. By way of example, it is possible that a constant width is provided in a confined area of the first area or second area.

It is possible to have a rotor in which the smallest width of the first area is smaller than the smallest width of the second area and that the second area is a notch free area. This solution will, in a simple way, make it possible to reduce the magnetic flux running in undesired directions and the magnetic leakage flux in general.

It may be beneficial that at least one notch is bordering on a first side wall and a second side wall and at least a part of the first side wall and/or a part of the second side wall extends basically perpendicular to edge.

Advantageously, at least some of the rotor bar slots have a basically straight side extending basically tangential to a radius of the rotor and the end of an adjacent the magnet slot has a side that extends basically parallel to the basically straight side of the rotor bar slot. Hereby it is achieved that the same punching tool can be used to provide all the rotor bar slots in a rotor sheet.

It may be an advantage that at least some of the rotor bar slots have a basically circular arced side and the end of the magnet slots has a basically circular arced side. It may be beneficial to have a rotor in which the rotor bar slots and the end of the magnet slots are provided with circular arced sides because the slots in each rotor sheet can be made by using the same punching tool even if the rotor is a skewed rotor where adjacent rotor sheets are rotated relative to one another.

It may be beneficial that the basically circular arced side of a rotor bar slot has a radius of curvature that is smaller than the radius of curvature of the basically circular arced side of an adjacent magnet slot.

It may be an advantage that the first width is smaller than two times the thickness of the laminated rotor sheets. Such embodiment can limit the magnetic flux running in undesired directions and the magnetic leakage flux significantly compared with the prior art.

It may be an advantage that the length of the first area is smaller than the length of the second area. Thus, the rotor sheet band can have a great mechanical strength even when a notch is provided.

It may be an advantage that the length of the first area is smaller than a fourth of the length of that side of the rotor bar slot that faces the side of an adjacent magnet slot. Hereby the rotor sheet band can maintain a high mechanical strength even though a notch is provided in the rotor sheet band.

It may be an advantage that at least one notch having an elongated geometry is provided in the first area. If the notch has an elongated geometry it will be possible to provide a very small bridge so that the magnetic leakage flux can be minimized. Accordingly, a greater part of the end portion of the permanent magnets can be used to generate torque.

Advantageously, at least some of the rotor bar slots have a basically straight side extending basically tangential to a radius of the rotor and the end of and adjacent the magnet slot has a side that extends basically parallel to the basically straight side of the rotor bar slot.

Hereby it is achieved that the same punching tool can be used to provide all the rotor bar slots in a rotor sheet.

It may be beneficial that at least some of the rotor bar slots have a basically circular arced side and the end of the magnet slots has a basically circular arced side.

It is possible that at least some of the rotor bar slots have a basically circular arced or straight side and that the end of the magnet slots has a basically circular arced or straight side and that the sides are basically symmetric about a radius of the rotor.

Hereby it is possible to change the angular displacement between the end area of a magnet slot and the adjacent rotor bar slot and hereby rotate the end area of a magnet slot relative to its adjacent rotor bar slot) and still be able to provide a very small distance between the end area of a magnet slot and the adjacent rotor bar slot by making a notch in the rotor sheet band.

It may be beneficial that the basically circular arced side of the rotor bar slots have a radius of curvature that is smaller than the radius of curvature of the basically circular arced side of the magnets slots.

Hereby it is achieved that the end area of a magnet slot can be rotated relative to the adjacent rotor bar slot and still making it possible to provide a very small distance between the end area of a magnet slot and the adjacent rotor bar slot and the corresponding rotor sheet band by a notch punching process.

It is possible that a first notch extends from the edge of the rotor bar slot towards the end area while a second notch extends from the edge of the end area. The first notch may extend perpendicular to an edge of the rotor bar slot and the second notch may extend perpendicular to an edge of the end area.

Advantageously, two times the width of the first area is smaller than the width of the second area.

It may be beneficial that the rotor bar slot has a basically straight or circular arced side and the end of the magnets slot has a basically straight or circular arced side and a basically U-shaped notch extends radially from a basically straight side of the rotor bar slot towards a basically circular arced side of the end of the magnets slot.

Advantageously, the end area of each magnet slot is magnet free and at least partly filled with air and/or aluminum and/or plastic and/or glue. Hereby it is possible to use simple shaped magnets e.g. block shaped magnets. It is also achieved that a short circuit of the magnetic flux can be avoided so that the end part of the magnet can be used to generate torque.

The rotor may be a two-poled rotor, a four-pole or a six-pole rotor by way of example.

It is an advantage that axially extending interlock members are provided between all adjacent laminated rotor sheets. These inter lock members may be made by a punching process where laminated rotor sheet material from a laminated rotor sheet is punched into the adjacent laminated rotor sheet so that the two neighboring laminated rotor sheet are mechanically fixed to one another.

Advantageously, the magnets are block shaped. This may be an advantage because it will be easy to arrange block shaped magnets in the corresponding magnet slot. The magnets may be attached to the rotor mechanically or by using glue by way of example.

The rotor according to the invention may be used in line start motor for a pump device. Such pump device may be an unregulated circulator pump by way of example.

The invention is not limited to the described embodiments which can be modified in many ways.

Preferred embodiments of the present invention will now be more particularly described, by way of example, with reference to the accompanying drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 12 is a rotor according to the invention.

DESCRIPTION OF THE PREFERRED EMBODIMENTS

Other objects and further scope of applicability of the present invention will become apparent from the detailed description given hereinafter. It should be understood, however, that the detailed description and specific examples, indication preferred embodiments of the invention, are given by way of illustration only, since various changes and modifications within the spirit and scope of the invention will be become apparent to those skilled in the art from this detailed description.

Figure 1:
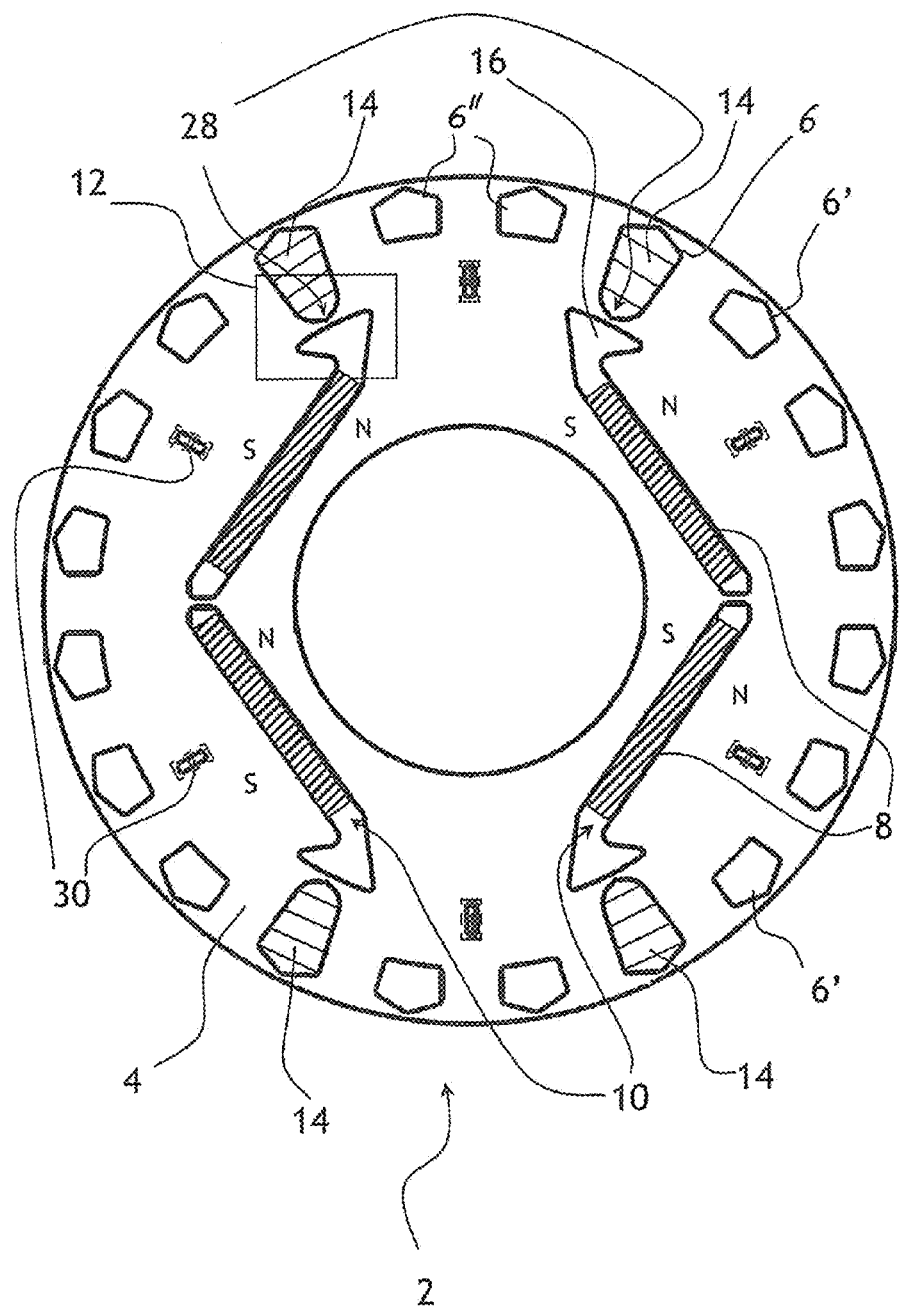
FIG. 1 is a cross sectional view of a rotor according to the invention.

Referring now in detail to the drawings for the purpose of illustrating preferred embodiments of the present invention, elements of a rotor according to the present invention is illustrated in FIG. 1. The rotor 2 comprises a number of thin laminated rotor sheet 4 stacked on the top of each other. The rotor sheets 4 are laminated in order to avoid generation of eddy currents in the axial direction of the rotor 2. The rotor sheets 4 are punched together so that rotor sheet material protrudes through the adjacent rotor sheet 4. The punched rotor sheet material constitutes interlock members 30. In this way, it is possible to provide a simple way of locking adjacent rotor sheets 4.

In each rotor sheet 4 there is provided rotor bar slots 6 configured to receive rotor bars 14 and magnet slots 10 configured to receive longitudinal block shaped magnets 8. The distal end 16 of the magnet slots 10 is an air filled and magnet free area. A bridge 12 is provided at each distal end 16 of the magnet slots 10. In order to make the bridges 12 as thin as possible a notch 28 is provided in the rotor sheet band 22. These notches 28 may be made by removing material from the rotor sheet band 22 by a punching process. The notch 28 may be V-shaped, U-shaped or have a rectangular geometry by way of example.

The rotor 2 in FIG. 1 comprises four permanent magnets 8 each having a north pole N and a south pole S. These permanent magnets 8 may be neodymium magnets (NdFeB) or ferrite magnets by way of example. The magnets 8 may be coated or be arranged in a sleeve. The magnets 8 are bar shaped and arranged tangentially near the central part of the rotor 2.

Four rotor bars 14 are arranged in four rotor bar slots 6 and a bridge 12 is arranged between the magnet slots 10 and the neighboring bar slots 6. The magnets 8 are arranged pair wise to form a symmetric rotor 2. Six rotor bar slots 6' are arranged along the periphery of the rotor 2 in the area between the pair wise arranged magnets 8. Two rotor bar slots 6" are arranged along the periphery of the rotor 2 in the area between opposite magnets.

It is possible to alter the number of rotor bar slots 6', 6" if the rotor 2 is scaled. In principle, for a rotor 2 of small diameter the number of rotor bar slots 6', 6" would be lower than for a rotor 2 of larger diameter.

The rotor 2 according to the present invention may be coated. The rotor 2 according to the present invention may be arranged in a sleeve or it may be provided without a coating or sleeve.

The rotor 2 may be use for a line start motor for a pump. It is possible to use the rotor 2 in a motor for a centrifugal type pump, by way of example an unregulated circulator pump. Hereby it is possible to achieve a high efficiency. The pump may be a vet runner type circulator pump.

It is possible to use the rotor 2 in a motor for a dry runner pump and it is possible to use the rotor 2 in a motor that is controlled by a frequency converter.

The rotor 2 may be used in all sizes of line start motors. By way of example the power may be from under 20 W up to 22 kW.

In one embodiment or the invention the rotor 2 is used in an unregulated circulation pump configured to circulate fluid e.g. in a heating system or in a cooling system. In this way it may be possible to have an unregulated pump with a high efficiency.

Figure 2:
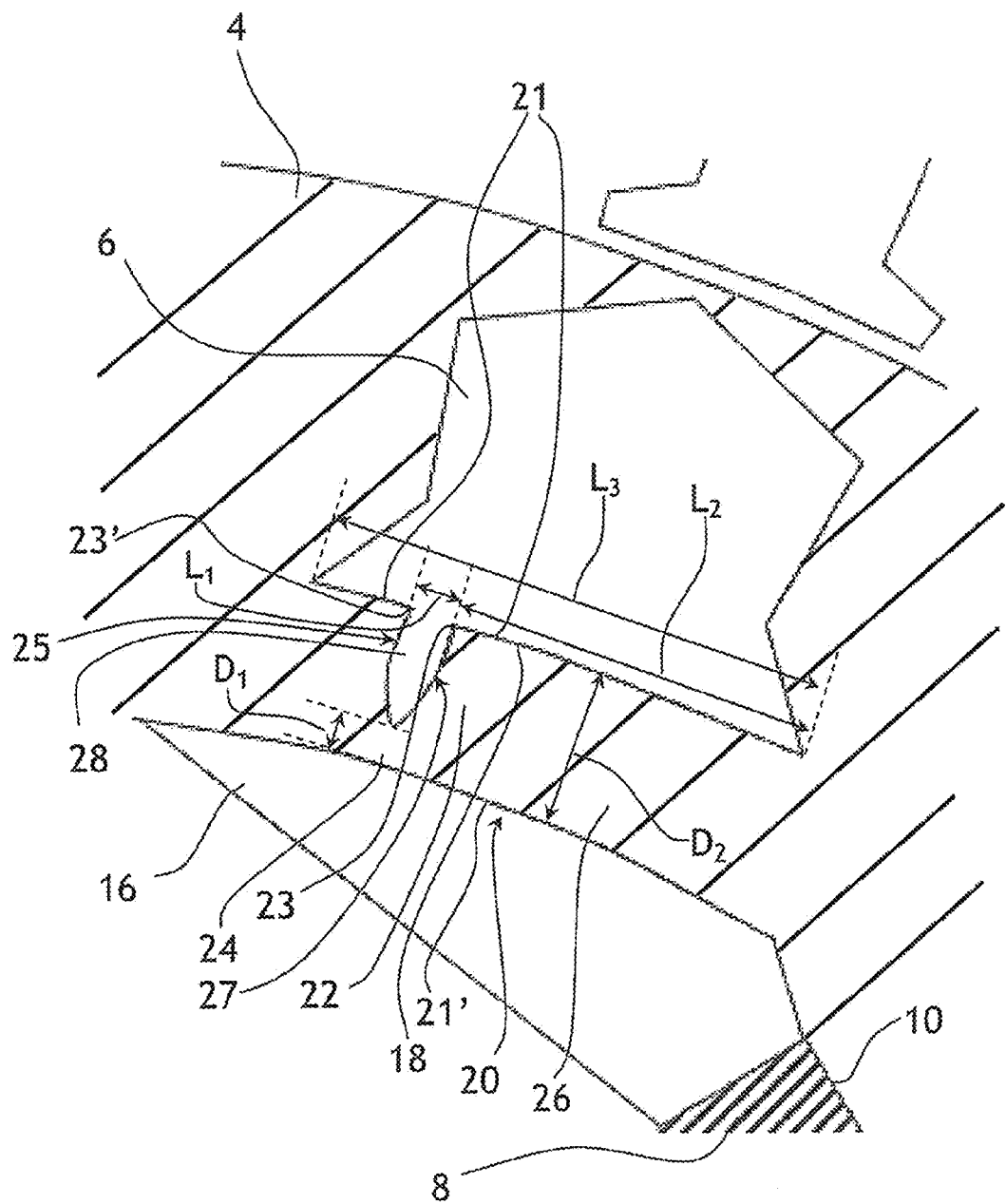
FIG. 2 is a cross sectional view of a rotor bar slot and the end of an adjacent magnet slot according to the invention.

FIG. 2 is a cross sectional view of a rotor bar slot 6 and a distal end 16 of an adjacent magnet slot 10 according to the invention. The rotor bar slot 6 is provided in the rotor sheet 4 near the periphery of the rotor sheet 4. A magnet 8 is arranged in the corresponding magnet slot 10. When one takes a closer look at the rotor sheet band 22 it can be seen that a basically U-shaped notch 28 extend radially from the basically straight side 18 of the rotor bar slot 6 towards the basically circular arced side 20 of the distal end 16 of the magnet slot 10. The notch 28 does not extend through the total width of the rotor sheet band 22 since a first area 24 is provided between the notch 28 and of the distal end 16 of the magnet slot 10. The first area 24 is defined by a first distance $D_1$ between the rotor bar slot 6 and the distal end area 16. This first distance $D_1$ is small in comparison with the prior art rotors.

A second area 26, having a significantly larger width, is provided next to the first area 24. The width of the second area 26 is indicated by the distance $D_2$ between the rotor bar slot 6 and distal end area 16. The first distance $D_1$ is significantly smaller than the second distance $D_2$.

It is not possible to provide a rotor 2 having a rotor sheet band 22 with a width corresponding to $D_1$ because the rotor sheet band 22 is required to have a certain minimum width in order to have the required mechanical strength. If the rotor sheet band 22 has a width below the required minimum width, it would be very likely that the rotor sheet band 22 would crack. Normally it is assumed that the required minimum width is two times the thickness of a rotor sheet layer. If the thickness of a rotor sheet layer is 0.5 mm the required minimum width of the rotor sheet band is 1 mm.

The present invention makes it possible to reduce the smallest width of the rotor sheet band locally so that the first distance $D_1$ is significantly smaller than the second distance $D_2$.

FIG. 2 shows that the length $L_1$ of the first area 22 is significantly smaller than the length $L_2$ of the second area 24. By providing a rotor 2 having a rotor sheet band 22 with a notch 28 so that the length $L_1$ of the first area 22 is smaller than the length $L_2$ of the second area 24 and that the second area 26 has a significantly larger width $D_2$ than the width $D_1$ of the first area 24, it is possible to provide the required mechanical strength to the rotor sheet 4 and reduce the magnetic flux running in undesired directions and the magnetic leakage flux in general because of the small width $D_1$ between the between the rotor bar slot 6 and the distal end area 16.

In FIG. 2 the width $D_3$ of the rotor bar slot 6 is larger than the length $L_2$ of the second area 24 and the notch 28 is provided in the left side of the rotor sheet band 22.

By having a small width $D_1$ between the between the rotor bar slot 6 and the distal end area 16 that part of the flux from the magnet that flows in the rotor sheet band 22 and hereby does not link with the stator current is reduced significantly compared with the prior art rotors. The leakage magnet flux does not contribute to the torque. Accordingly, a reduction of the leakage magnet flux makes it possible to until is as much of the magnets as possible.

The short distance $D_1$ between the rotor bar slot 6 and the distal end area 16 means that the leakage magnet flux is reduced significantly compared with an embodiment without the notch 28.

The side walls 25, 27 extend basically parallel to each other. However, they may have other configurations.

The rotor 2 may be skewed so that the rotor bar slots 6 extend along one or more axes that are inclined relative to the longitudinal axis X of the rotor. It is well known that a motor with reduced cogging torque can be achieved in this way.

Figure 3:
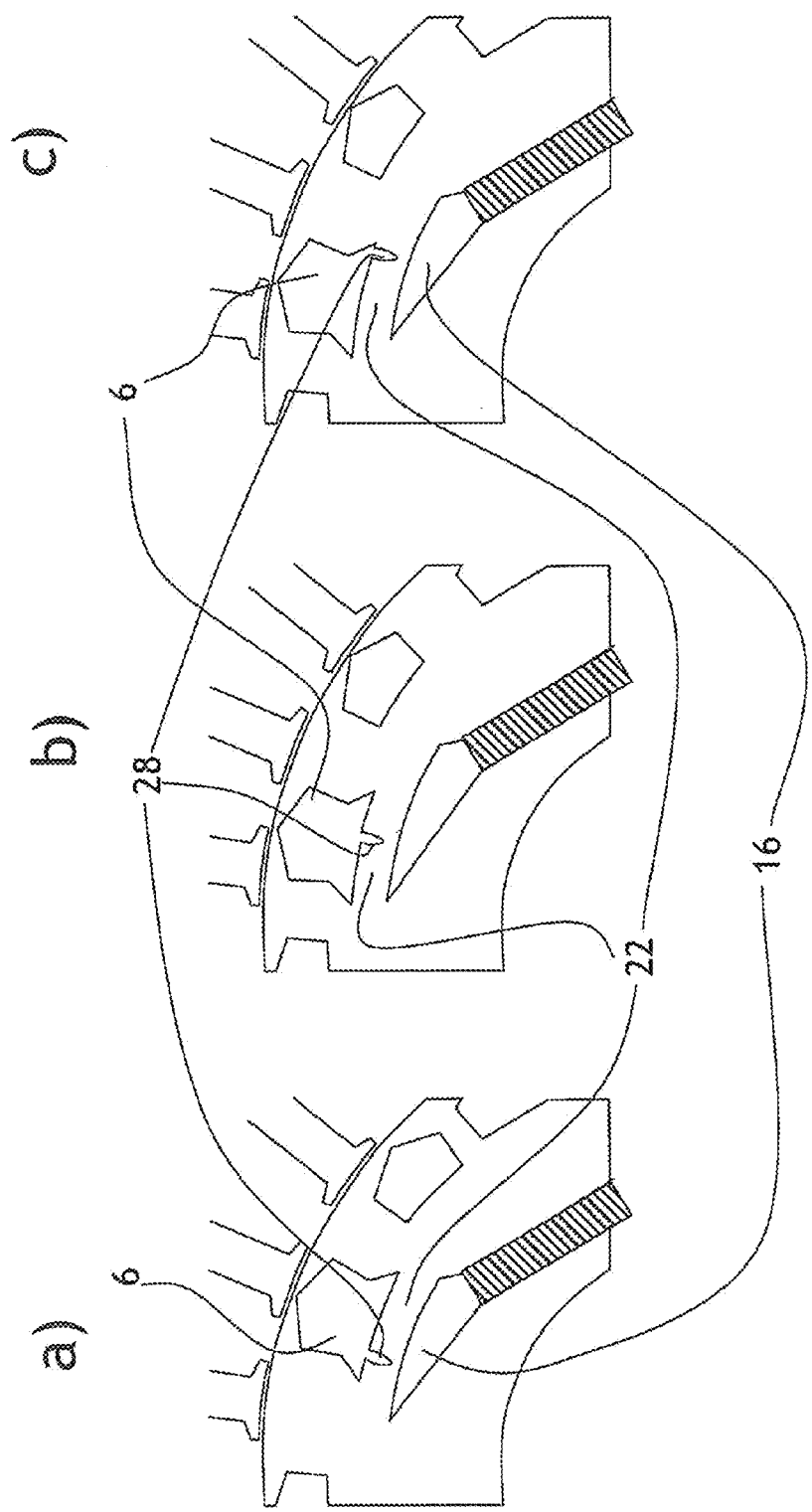
FIG. 3 is three close up views of rotor sheets according to the invention.

FIG. 3 illustrates three different ways of arranging the notch 28 in the rotor sheet band 22. In both FIG. 3 a), FIG. 3 b) and FIG. 3 c) the notch 28 extend radially from a basically straight side 18 of the rotor bar slot 6 towards a basically circular arced side 20 of the distal end 16 of the magnet slot 10 like illustrated in FIG. 2. FIG. 3, however; illustrates that the notch 28 can be arranged in different positions of the rotor sheet band 22. The notch 28 has elongated geometry that is rounded off in its distal end. In FIG. 3 a) the notch 28 is arranged in the left side of the rotor sheet band 22. In FIG. 3 b) the notch 28 is arranged near the central part of the rotor sheet band 22 and in FIG. 3 c) the notch 28 is arranged in the right side of the rotor sheet band 22. The notches 28 may be provided with a different geometry. The notches may be V-shaped, U-shaped or rectangular by way of example. In FIG. 3 a), FIG. 3 b) as well as FIG. 3 c) the notches extend more than half way through the rotor sheet band 22. Accordingly, the distance between the rotor bar slot and the adjacent end 16 of the magnet slots 10 is smaller that half the width of the rotor sheet band.

A skewed rotor 2 can be achieved by providing rotor sheets 4 in which the rotor bar slot 6 and the end 16 of the adjacent magnet slot 10 are displaced relative to each other. The different rotor sheets 4 can be produced by using the same punching tool if the part of the end area that faces the adjacent rotor bar slot comprises a side that is arranged symmetric relative to a radius of the rotor or if the part of the adjacent rotor bar slot that faces the end area comprises a side that is arranged symmetric relative to a radius of the rotor.

In FIG. 3 a), FIG. 3 b) and FIG. 3 c) the notches 28 extend perpendicular to side 18 of the rotor bar slot 6. The side 18 is basically straight; however it is possible to have a side 18 that has a different geometry. The notches 28 may be produced by a punching process and it is even possible to make the both a rotor bar slot 6 and its notch 28 by the same punching process. It is, however; also possible to provide a rotor bar slot 6 by a first punching process and make the notch in another punching process.

Figure 4:
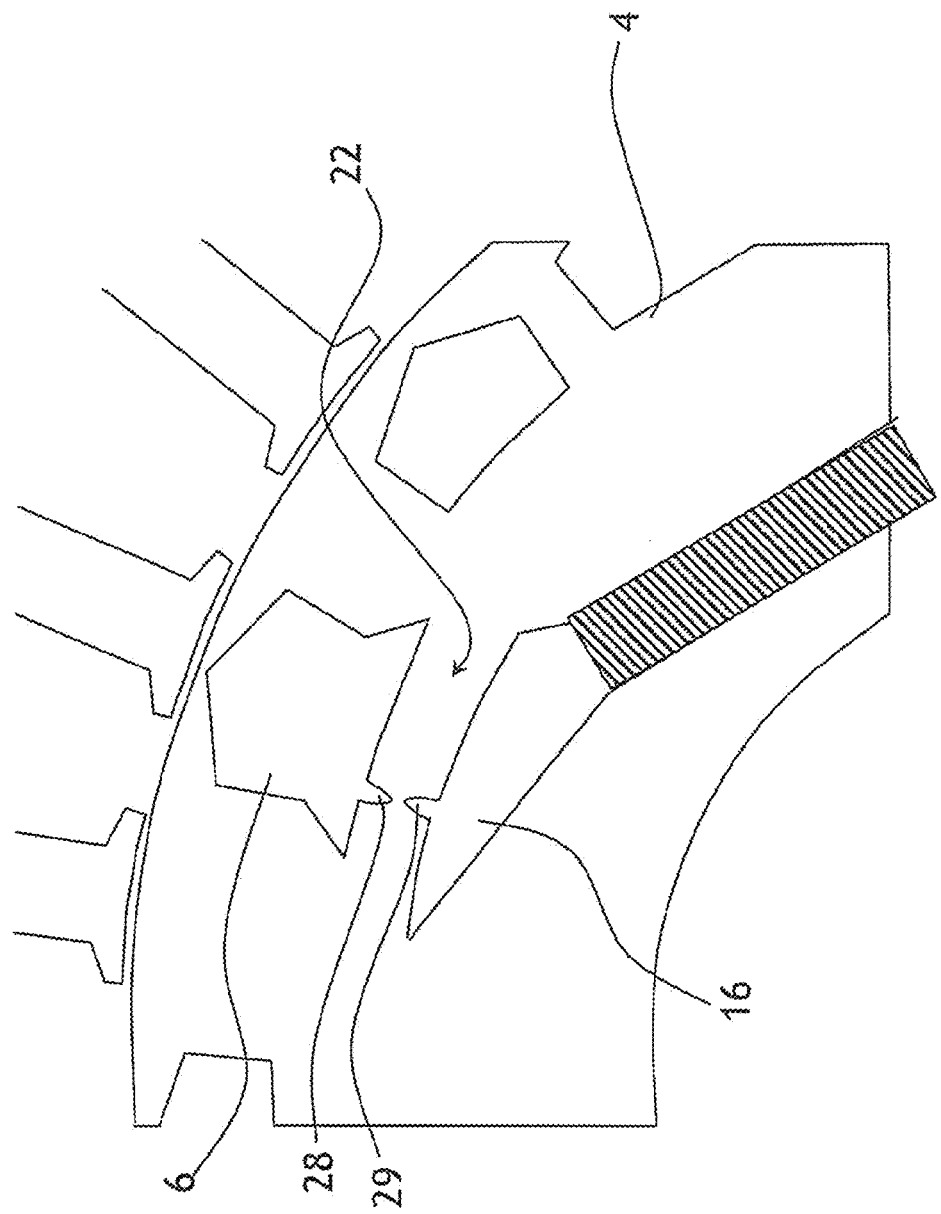
FIG. 4 is a close up view of another rotor sheet according to the invention.

FIG. 4 illustrates a rotor sheet band 22 in which two notches 28, 29 are provided. The first notch 28 extends radially from the rotor bar slot 6 towards the distal end 16 of an adjacent magnet slot. The second notch 29 extends radially from the distal end 16 of the magnet slot towards the first notch 28.

Hereby it is possible to provide the required mechanical strength to the rotor sheet 4 and reduce the magnetic flux running in undesired directions because of the small distance between first notch 28 and the second notch 29.

The notches 28, 29 may have the same geometry, however; it is also possible to provide a first notch 28 having a first geometry and a second notch 29 with a different geometry. The notches 28, 29 are arranged directly opposite each other so that the first notch 28 extends from the edge of the rotor bar slot 6 towards the edge of the end area 16 of the magnet slot 10. It is, however, also possible to arrange the notches 28, 29 in other ways e.g. by displacing the first notch 28 radially relative to the second notch 29.

Figure 5:
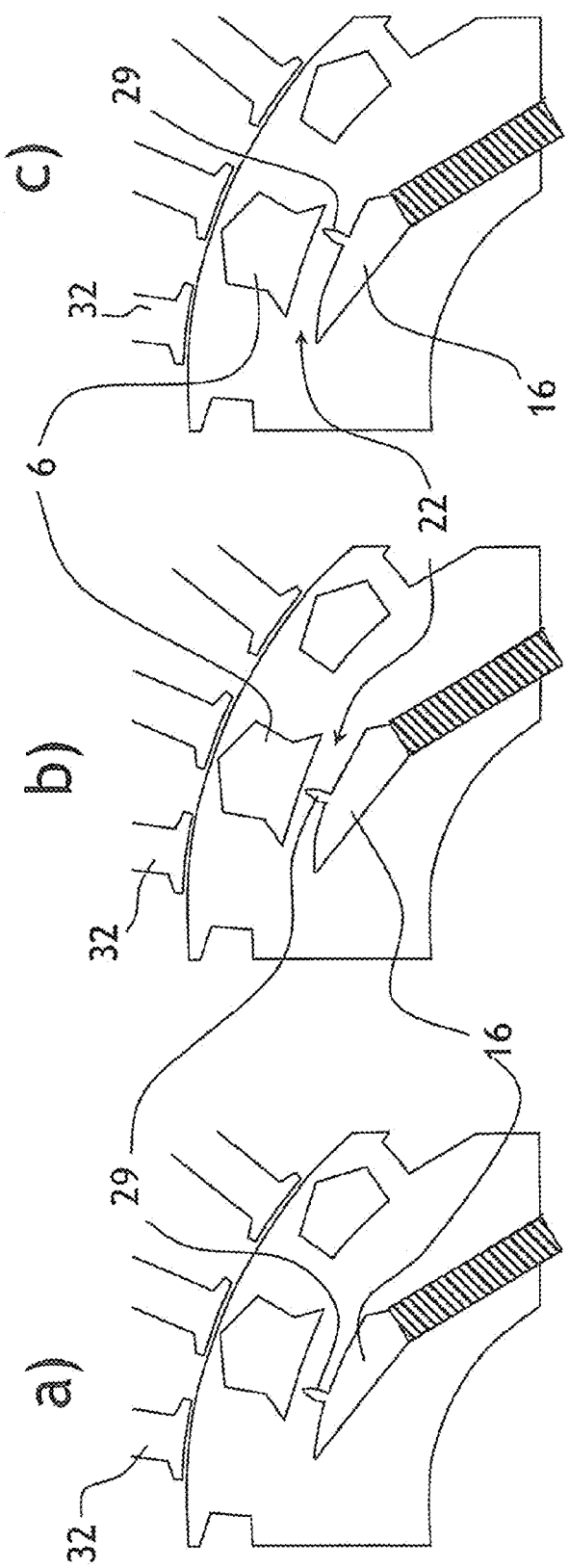
FIG. 5 is three close up views of rotor sheets according to the invention.

FIG. 5 illustrates three different ways of arranging the notch 29 in the rotor sheet band 22. In FIG. 5 a), FIG. 5 b) as well as in FIG. 5 c) the notch 29 extend radially from a basically circular arced side 20 of the distal end 16 of the magnet slot 10 towards the adjacent rotor bar slot 6. The notches 29 have an elongated geometry and the notches 29 are rounded off in their distal end like the notched shown in FIG. 3 and FIG. 4. In FIG. 5 a) the notch 29 is arranged at the left side of the rotor sheet band 22. In FIG. 5 b) the notch 29 is arranged at the central part of the rotor sheet band 22 and in FIG. 5 c) the notch 29 is arranged in the right side of the rotor sheet band 22. It is indicated that the rotor 2 is arranged in a stator 32. The notch 29 extends more than half way through the rotor sheet band 22. The notch 29 has a longitudinal geometry and it extends basically perpendicular to an edge of the distal end 16 of the magnet slot 10.

The rotor sheets 4 shown in FIG. 5 may be different rotor sheets 4 in a skewed rotor 2.

The stator may be a stator for a line start motor, since the rotor 2 is intended to be used in a line start motor e.g. for a pump such as an unregulated circulator pump.

The rotor bar slot 6 may have a different geometry than the one shown in FIG. 5. It is possible if the inwardly facing side 18 of the rotor bar slot 6 is either basically straight or basically circular arced. Moreover, it is possible to provide the side 20 of the end 16 of the magnet slot 10 so that it is basically parallel to the side 18 of the rotor bar slot 6.

Figure 6:
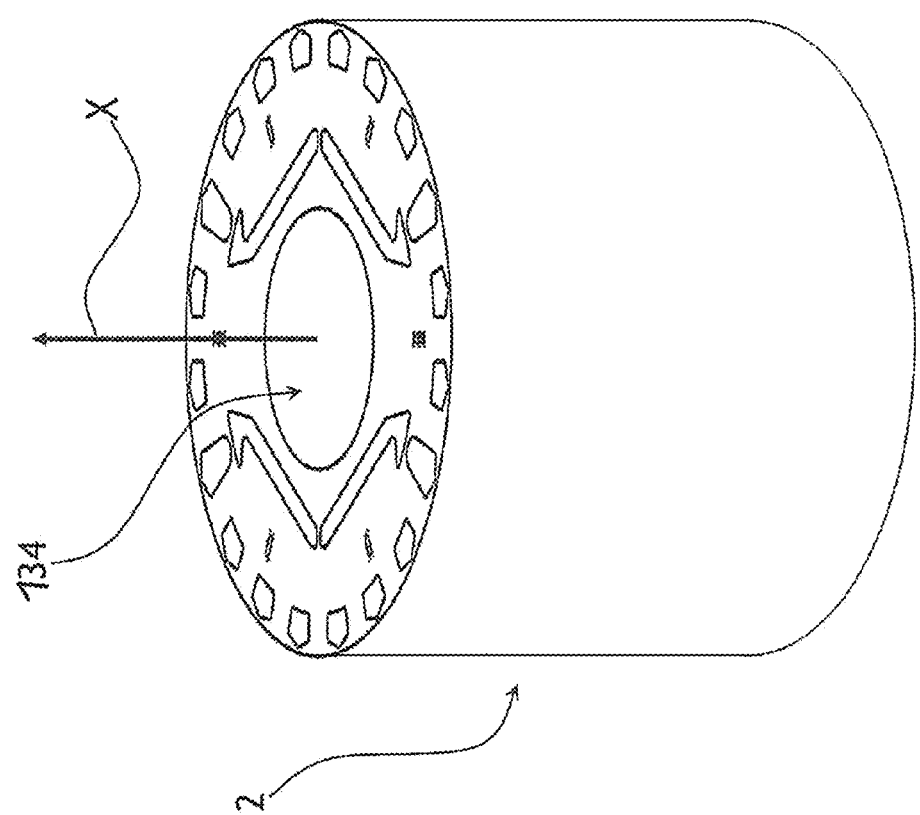
FIG. 6 is a perspective cutaway view of a rotor according to the invention.

FIG. 6 illustrates a perspective cutaway view of a rotor 2 according to the invention. The rotor 2 has a cylindrical channel 134 extending along the longitudinal axis X of the rotor. The channel 134 is configured to receive a shaft. The shaft may used to drive a pump by way of example.

Figure 7:
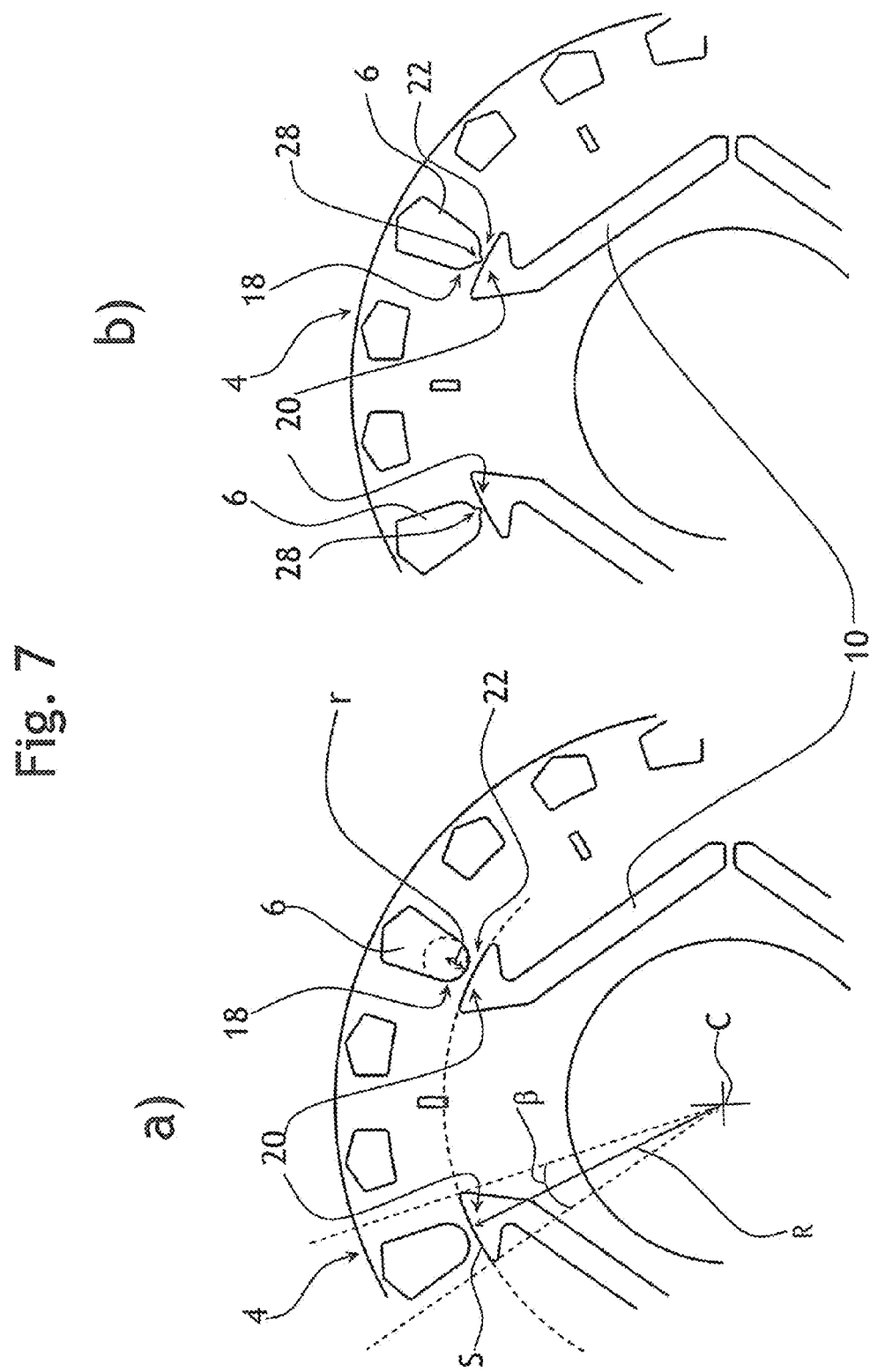
FIG. 7 is a cross sectional view of a rotor sheet according to the invention before and after notch is provided in the rotor sheet band.

FIG. 7 a) is a cross sectional view of a rotor sheet 4 according to the invention. Rotor bar slots 6 are provided in the rotor sheet 4 near the periphery of the rotor sheet 4 and corresponding magnet slots 10 are arranged closer to the central part of the rotor sheet 4. The rotor bar slots 6 have a circular arced side 18 having a radius of curvature, r, that is significantly smaller than the radius of curvature, R, of the circular arced side 20 of the distal end 16 of the magnets slots 10.

The side 20 of each end 16 of the magnet slots 10 have the same geometry. Moreover, the side 20 is symmetric. Therefore, it is possible to use the same punching tool to make all the sides 20. The rotor bar slots 6 have a circular arced side 18 that is symmetric so that the same punching tool can be used to make all sides 18 of the rotor bar slots 6. No notches have been provided in the rotor sheet band 22 in the rotor 2 illustrated in FIG. 7 a).

The rotor sheet 4 has a center C. It can be seen that the section S of the side 20 extends over an angle β. It may be an advantage that the angle β is so large that a skewed rotor 2 can be constructed out of rotor sheets 4 in which the angular positions of a rotor bar slot 6 relative to its adjacent end area 16 differs between adjacent rotor sheets 4. It may be an advantage that the rotor bars (and thus the rotor bar slots 6) extend along an axis that is inclined relative to the longitudinal axis X of the rotor 2 and that the magnet slots 10 extend parallel to the longitudinal axis X of the rotor 2. Hereby a skewed rotor 2 can be provided and the permanent magnets 8 can be block shaped.

In FIG. 7 b) a small elongated notch 28 is provided in each rotor sheet band 22. Each notch extends radially from the circular arced side 18 of the rotor bar slot 6 towards the distal end 16 of the adjacent magnet slot 10. The notch 28 divides the rotor sheet band 22 into a first area 24 and a second area 26. The width $D_1$ of the first area 24 is significantly smaller than the width $D_2$ of the second area 26.

The embodiment illustrated in FIG. 7 b) is simple to produce due to the fact that all the sides 20 of the end 16 of the magnet slots 10 have the same and symmetric geometry and that all the rotor bar slots 6 have the same and symmetric geometry. Hereby one punching tool can be used to make the all the sides 20 and similarly another punching tool may be used to make all the sides 18 of the rotor bar slots 6.

It is possible to provide a notch 29 that extends radially from an end 16 of a magnet slot 10 towards an adjacent arced side 18 of the rotor bar slot 6. It is also possible to provide more than one notch 28, 29 at the rotor sheet band 22.

Figure 8:
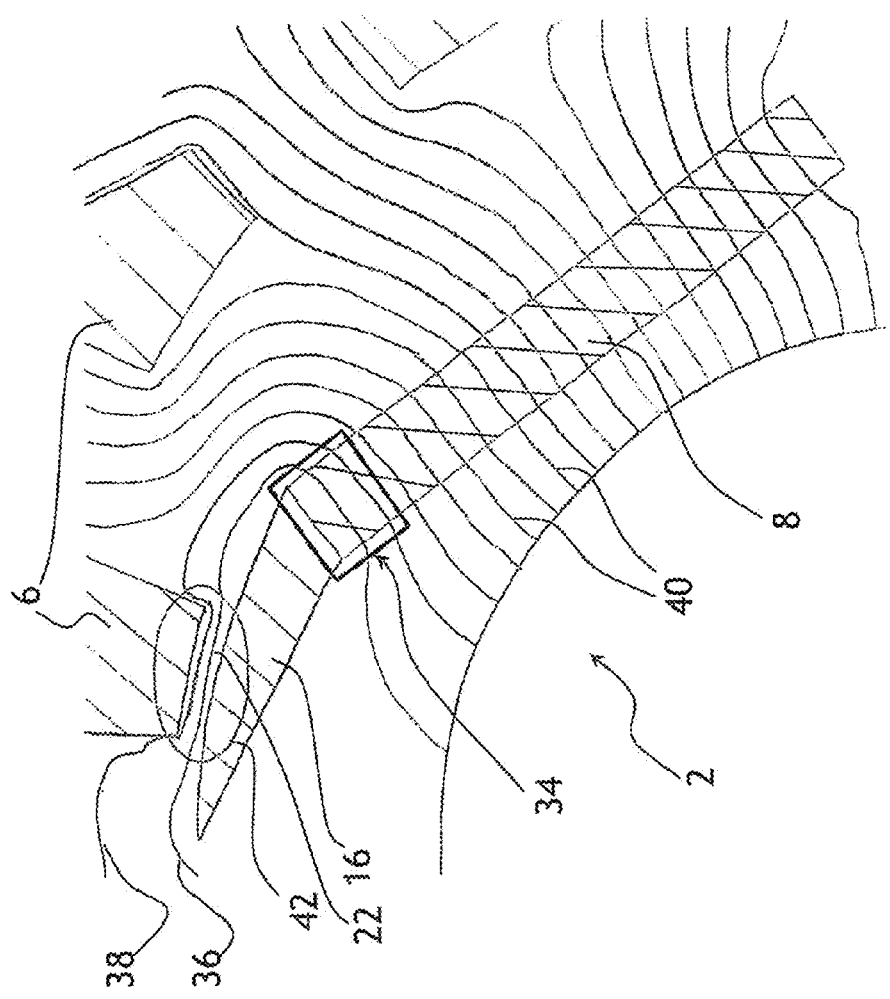
FIG. 8 is a closeup view of a rotor.

FIG. 8 is a closeup view of a typical prior art rotor 2 for a line start motor. The magnetic field lines 36, 38, 40 are indicated by lines. An indication rectangle 34 illustrates that the distal part of the magnet 8 does not contribute to generate a driving torque since the magnetic field lines extend along the rotor sheet band 22. The magnetic field lines 36 and 38 that extend along the rotor sheet band 22 are indicated by the indication ellipse 42 and these magnetic field lines 36 and 38 are referred to as leakage magnet flux.

Figure 9:
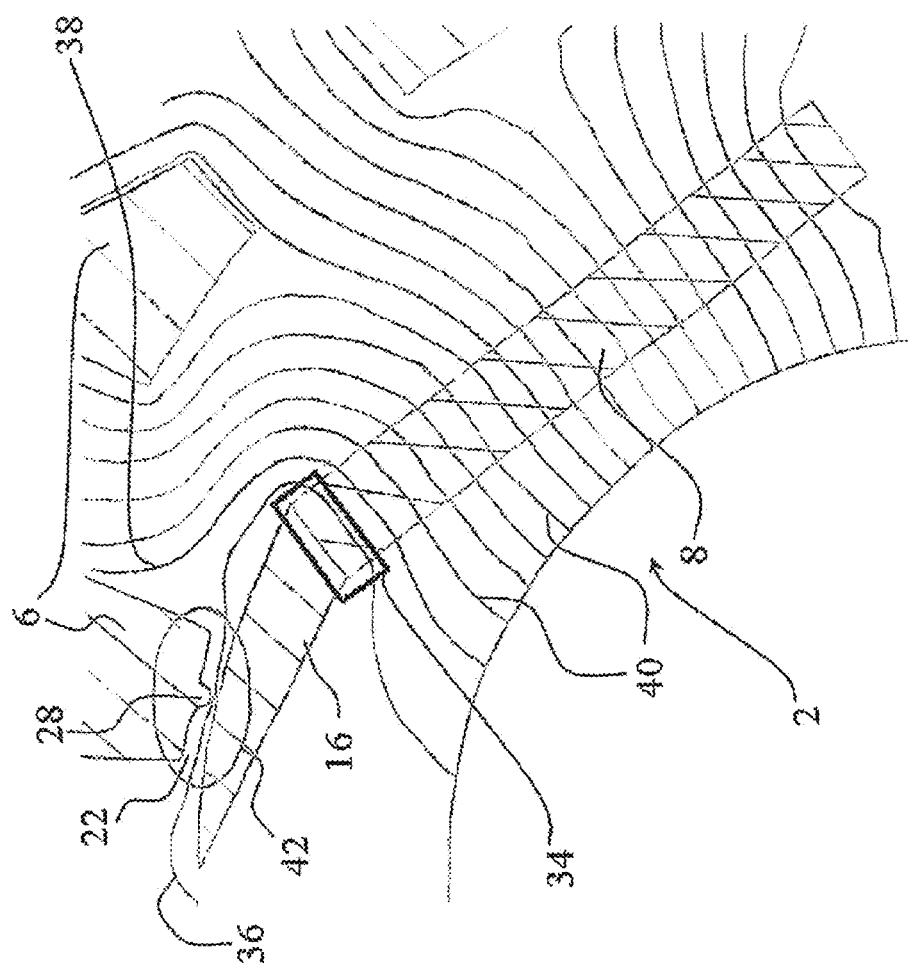
FIG. 9 is a closeup view of a rotor according to the invention.

FIG. 9 is a closeup view of a rotor 2 according to the invention. A notch 28 is provided in the rotor bar slot 6 and therefore the magnetic field line 38 extend along another path than in FIG. 8. The magnetic field line 36, however; extends along the same path than in FIG. 8 and the indication rectangle 34 is smaller than the one illustrated in FIG. 8. Therefore, it is a smaller portion of the magnet 8 that does not contribute to generate a driving torque when compared to FIG. 8. The magnetic flux, running in undesired directions, is reduced and the magnetic leakage flux is reduced. Therefore, it is possible to produce a rotor 2 having smaller magnets than the prior art rotors by using the present invention.

Figure 10:
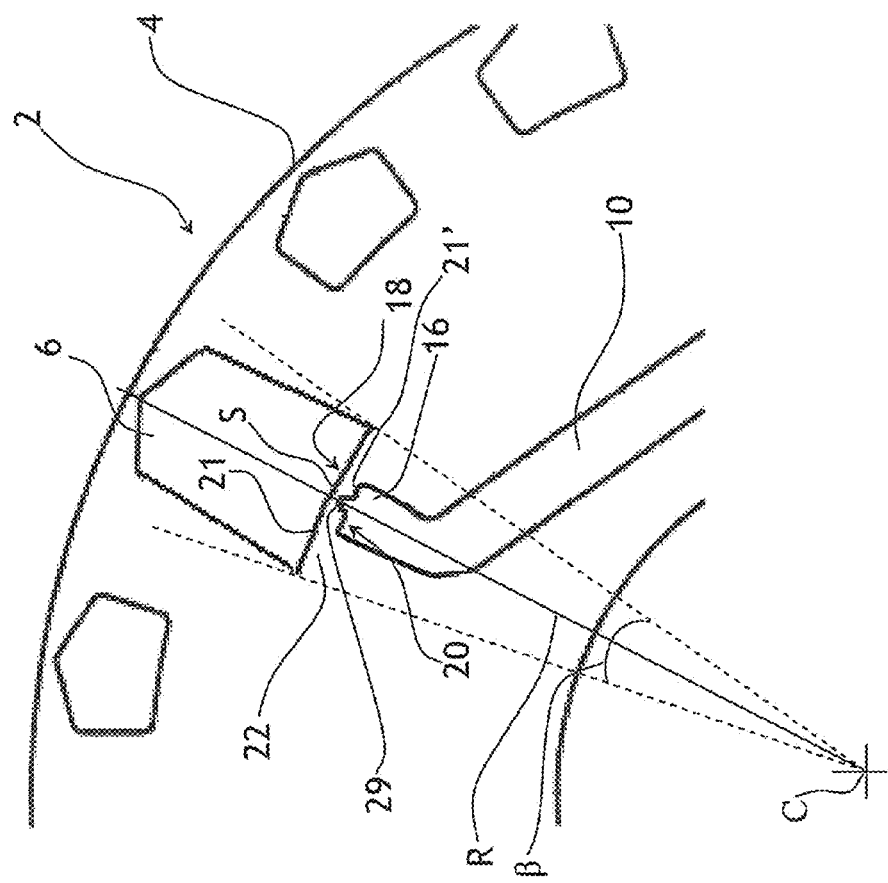
FIG. 10 is a closeup view of a rotor according to the invention.

FIG. 10 illustrates another embodiment of a rotor 2 according to the invention. The rotor 2 comprises a number of laminated rotor sheets 4. In the rotor sheet 4 that is visible in FIG. 10 a rotor bar slot 6 is arranged adjacent to an end area 16 of a magnet slot 10. The rotor sheet band 22 provided between the rotor bar slot 6 and the end area 16 of the magnet slot 10 has thickness corresponding to a typical prior art rotor. However; a notch 29 is provided in the rotor sheet bane 22. The notch 29 extends from the edge 21' of the end area 16 towards the edge 21 of the rotor bar slot 6. The notch 29 extends basically parallel to the radius R of the rotor 2. The side 18 of the rotor bar slot 6 and the side 20 of the adjacent magnet slot 10 extend tangential to a radius R of the rotor 2.

The center C of the rotor 2 is indicated and it can be seen that section S of the side 18 extends over an angle β that is so large that a skewed rotor 2 can be constructed out of rotor sheets 4 in which the angular positions of a rotor bar slot 6 relative to its adjacent end area 16 differs between adjacent rotor sheets 4. Preferable, the rotor bar slots 6 extend along an axis that is inclined relative to the longitudinal axis X of the rotor 2 and preferably, the magnet slots 10 extend parallel to the longitudinal axis X of the rotor 2.

Figure 11:
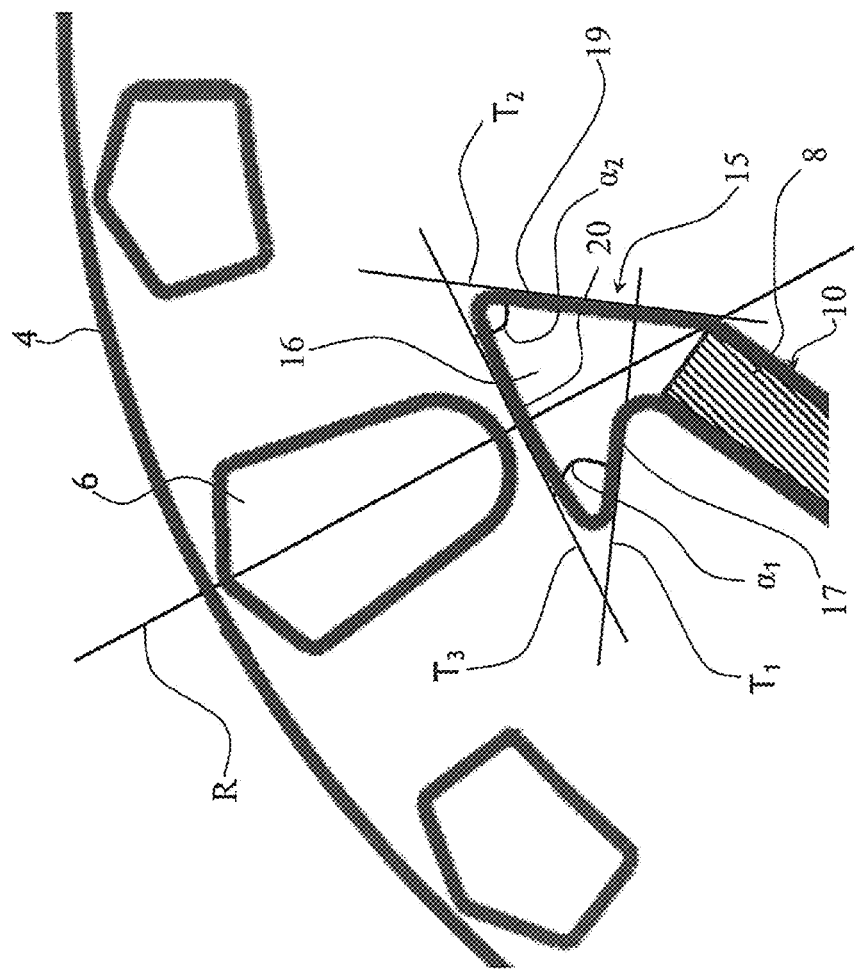
FIG. 11 is a closeup view of another rotor according to the invention.

FIG. 11 is a closeup view of another rotor 2 according to the invention. The rotor 2 comprises a number of laminated rotor sheets 4. The visible rotor sheet 4 has a rotor bar slot 6 that is arranged adjacent to the end area 16 of a magnet slot 10. The end area 16 has a first side 17 having a first tangent $T_1$, a second side 19 having a second tangent $T_2$ and a third side 20 having a third tangent $T_3$. These three sides 17, 19, 20 constitute a triangular portion 15. The angle $\alpha_1$ between the first tangent $T_1$ and the third tangent $T_3$ is about 45 degrees. The angle $\alpha_2$ between the second tangent $T_2$ and the third tangent $T_3$ is also about 45 degrees. The angle between the first tangent $T_1$ and the second tangent $T_2$ is about 90 degrees.

FIG. 12 shows a rotor 2 for a four pole permanent magnet line start motor. The rotor 2 comprises four sets of box-shaped permanent magnets 8 arranged tangentially and symmetrically in magnet slots 10 at the innermost part of the rotor 2. Each rotor sheet 4 of the rotor 2 is provided with rotor bar slots 6, 6', 6" arranged radially at the periphery of the rotor 2. The rotor sheet 4 has eight rotor bar slots 6 that are longer than the remaining rotor bar slots 6', 6". Each of these rotor bar slots 6 are longer than the remaining rotor bar slots 6', 6". The rotor bar slots 6 are arranged so that a short distance is achieved between each rotor bar slot 6 and its adjacent end area 16 of the magnet slots 10. A notch 28 is provided in each of the eight longest rotor bar slots 6.

The part of the end area 16 that faces the adjacent rotor bar slot 6 has a straight side 20 that is arranged basically symmetric relative to a radius R of the rotor 2. Moreover, the part of each rotor bar slot 6 that faces an adjacent end area 16 comprises a basically circular arced side 18 that also is arranged essentially symmetric relative to a radius R of the rotor 2.

Accordingly, the shortest distance between the straight side 20 and the basically circular arced side 18 can be kept constant when the rotor bar slot 6 is rotated (such that an angular displacement is provided between the rotor bar slot 6 and the basically circular arced side 18) relative to the magnet slot 10. Hereby it is possible to provide rotor sheets for a skewed rotor 2 by using the same punching tool for all rotor bar slots 6 and the same punching tool for all magnet slot 10.

While specific embodiments of the invention have been shown and described in detail to illustrate the application of the principles of the invention, it will be understood that the invention may be embodied otherwise without departing from such principles.

The invention claimed is:

1. A rotor for an electric motor, the rotor comprising:
   a plurality of laminated rotor sheets arranged in layers, each of the sheets being provided with magnet slots and rotor bar slots;
   a number of permanent magnets arranged within the magnet slots in the laminated rotor sheets, where an end area of each magnet slot is a magnet free area;
   a plurality of rotor bars arranged in rotor bar slots; and
   a rotor sheet band provided between the end area and an adjacent rotor bar slot, wherein at least one notch extends from an edge of the rotor bar slot and divides the rotor sheet band into a first area and a second area, where a smallest width of the first area is smaller than a smallest width of the second area, wherein a length of the first area is smaller than a fourth of a length of a side of the rotor bar slot that faces a side of an adjacent magnet slot, wherein said second area is a notch free area.

2. A rotor according to claim 1, wherein the at least one notch is bordering on a first side wall and a second side wall and that at least a part of the first side wall and/or a part of the second side wall extends essentially perpendicular to edge, wherein the first area is an area of the rotor sheet band extending in a radial direction between the at least one notch and the end area of the magnet slot, the second area being adjacent to the first area, wherein the second area is another area of the rotor sheet band extending in the radial direction between a portion of a radial inner edge of the rotor bar slot adjacent to the at least one notch and the end area of the magnet slot.

3. A rotor according to claim 1, wherein:
at least some of the rotor bar slots have an essentially straight side extending essentially tangential to a radius of the rotor; and
the end adjacent the magnet slot has a side that extending essentially parallel to the essentially straight side of the rotor bar slot.

4. A rotor according to claim 1, wherein:
at least some of the rotor bar slots have an essentially circular arced side; and
the end of the magnet slots has an essentially circular arced side.

5. A rotor according to claim 1, wherein:
at least some of the rotor bar slots have an essentially circular arced or straight side;
the end of the magnet slots has an essentially circular arced or straight side and
the sides are essentially symmetric about a radius of the rotor.

6. A rotor according to claim 4, wherein the essentially circular arced side of a rotor bar slot has a radius of curvature that is smaller than the radius of curvature of the essentially circular arced side of an adjacent magnet slot.

7. A rotor according to claim 1, wherein the first width is smaller than two times a thickness of one laminated rotor sheet.

8. A rotor according to claim 1, wherein the length of the first area is smaller than the length of the second area.

9. A rotor according to claim 1, wherein another notch having an elongated geometry, is provided in the first area.

10. A rotor according to claim 1, wherein the end area of each magnet slot is magnet free and at least partly filled with air and/or aluminum and/or plastic and/or glue.

11. A rotor according to claim 1, wherein axially extending interlock members are provided between all adjacent laminated rotor sheets.

12. A rotor according to claim 1, wherein the rotor bar slots are skewed with respect to a longitudinal axis of the rotor.

13. A pump device having a line start motor with a rotor comprising:
a plurality of laminated rotor sheets arranged in layers, each of the sheets being provided with magnet slots and rotor bar slots;
a plurality of permanent magnets arranged within the magnet slots in the laminated rotor sheets, an end area of each magnet slot being a magnet free area;
a plurality of rotor bars arranged in rotor bar slots; and
a rotor sheet band provided between the end area and an adjacent rotor bar slot, wherein at least one notch extends from an edge of the rotor bar slot and divides the rotor sheet band into a first area and a second area, where a smallest width of the first area is smaller than a smallest width of the second area, wherein a length of the first area is smaller than a fourth of a length of a side of the rotor bar slot that faces a side of an adjacent magnet slot, wherein said second area is a notch free area.

14. A pump device according to claim 13, wherein the pump is a circulator pump, wherein the first area is an area of the rotor sheet band extending in a radial direction between the at least one notch and the end area of the magnet slot, the second area being adjacent to the first area, wherein the second area is another area of the rotor sheet band extending in the radial direction between a portion of a radial inner edge of the rotor bar slot adjacent to the at least one notch and the end area of the magnet slot.

15. A pump device according to claim 14, wherein the at least one notch is bordering on a first side wall and a second side wall and that at least a part of the first side wall and/or a part of the second side wall extends essentially perpendicular to edge.

16. A pump device according to claim 15, wherein:
at least some of the rotor bar slots have an essentially straight side extending essentially tangential to a radius of the rotor; and
the end adjacent the magnet slot has a side that extending essentially parallel to the essentially straight side of the rotor bar slot.

17. A pump device according to claim 14, wherein:
at least some of the rotor bar slots have an essentially circular arced side; and
the end of the magnet slots has an essentially circular arced side.

18. A pump device according to claim 14, wherein:
at least some of the rotor bar slots have an essentially circular arced or straight side;
the end of the magnet slots has an essentially circular arced or straight side; and
the sides are essentially symmetric about a radius of the rotor.

19. A pump device according to claim 18, wherein the essentially circular arced side of a rotor bar slot has a radius of curvature that is smaller than the radius of curvature of the essentially circular arced side of an adjacent magnet slot.

20. A rotor for an electric motor, the rotor comprising:
a plurality of rotor sheets arranged in layers, each of the sheets comprising magnet slots and rotor bar slots;
a number of permanent magnets arranged within the magnet slots in the rotor sheets, each of the magnet slots comprising a magnet free end area;
a plurality of rotor bars arranged in rotor bar slots, each of the rotor bar slots comprising a rotor bar slot side facing an adjacent magnet slot, said rotor bar slot side comprising a rotor bar slot side length; and
a rotor sheet band provided between the magnet free end area and an adjacent rotor bar slot, at least one notch extending from an edge of the rotor bar slot, said at least one notch dividing the rotor sheet band into a first area and a second area, said first area comprising a first area smallest width and a first area length, said second area comprising a second area smallest width, said first area smallest width being less than said second area smallest width, said first area length being less than twenty-five percent of said rotor bar slot side length.

* * * * *